United States Patent [19]

Thiele et al.

[11] Patent Number: 4,883,178

[45] Date of Patent: Nov. 28, 1989

[54] MULTIPLE PACKING FOR MAGNETIC TAPES WOUND ON CORES

[75] Inventors: Hartmut Thiele; José Toral, both of Munich, Fed. Rep. of Germany

[73] Assignee: Agfa-Gevaert Aktiengessellschaft, Leverkuse, Fed. Rep. of Germany

[21] Appl. No.: 279,401

[22] Filed: Dec. 2, 1988

[30] Foreign Application Priority Data

Dec. 16, 1987 [DE] Fed. Rep. of Germany ... 8716579[U]
Dec. 16, 1987 [DE] Fed. Rep. of Germany ... 8716580[U]
Mar. 8, 1988 [DE] Fed. Rep. of Germany ... 8803062[U]

[51] Int. Cl.$^4$ .............................................. B65D 85/67
[52] U.S. Cl. ............................... 206/391; 242/118.62; 206/394; 206/397; 206/414; 206/415; 206/416
[58] Field of Search ............... 206/391, 397, 394, 416, 206/415, 414; 242/118.62, 118.61

[56] References Cited

U.S. PATENT DOCUMENTS

| 1,758,229 | 5/1930 | Kneen | 242/118.61 |
| 4,081,151 | 3/1978 | Ender et al. | 206/394 |
| 4,657,140 | 4/1987 | Zagar et al. | 206/397 |
| 4,708,246 | 11/1987 | Minion | 206/394 |

FOREIGN PATENT DOCUMENTS

| 062224 | 10/1982 | European Pat. Off. | 206/389 |
| 611657 | 4/1935 | Fed. Rep. of Germany | 206/414 |
| 616838 | 11/1926 | France | 242/118.62 |
| 632156 | 1/1928 | France | 206/391 |
| 638511 | 12/1978 | U.S.S.R. | 206/416 |
| 296638 | 9/1928 | United Kingdom | 206/397 |

Primary Examiner—William Price
Attorney, Agent, or Firm—Connolly and Hutz

[57] ABSTRACT

A packing for a plurality of recording tapes wound on flangeless core hubs having central bores (so called pancakes) are described. The packing comprises plastic pallets in the form of discs which protect the outer reels of tape and a fixing device which extends upwards in the axial center, the diameter of which fixing device corresponds to the clear internal diameter of the bores of the core hubs and of the plastic disc. The fixing device is a centering sleeve (1,13, 22) which can be inserted through the outer walls (2, 30 and through the central bores of the core hubs (9) and has a closure clement which co-operates with another closure element so that the two parts cna be locked and tightened together, and the centering sleeve optionally has additional elements (7, 8) which prevent rotation of the centering sleeve against the outer walls of the plastic discs during opening or closing of the packing (FIG. 1).

10 Claims, 4 Drawing Sheets

MULTIPLE PACKING FOR MAGNETIC TAPES WOUND ON CORES

This invention relates to a packing for a plurality of recording tapes wound on flangeless reel hubs perforated by central bores (so called pancakes), the packing consisting of plastic discs which cover the outer reels of tape and of a fixing device extending upwards in the central axis of the bores and having a diameter equal to that of the central bore of the reel hubs.

So called raw goods packages are being sold worldwide by magnetic tape manufacturers. In these packages, the magnetic tape is wound on hubs, for example flangeless reel hubs (either the so called NARTB hubs or stackable hubs according to U.S. Pat. No. 4,081,151, etc.). These pancakes are at present either packaged individually or enclosed in collective packings which are shrunk over them or they are held in position by various forms of cardboard.

The disadvantage of individual packaging is that it requires a large amount of packaging material.

The disadvantage of the multiple packages described above is that although the outer layers of magnetic tapes are protected by styropore discs and the stack of pancakes is enclosed in a shrink film, the arrangement does not provide optimum protection for the tapes.

The following defects are liable to occur during storage or transport:

The shrink foil packing puts the outer edges under tension and exerts pressure on the inner magnetic tapes so that the whole reel of tape may be deformed into a dish shape.

When the goods are transported lying down, i.e. with the reels and hubs placed horizontally, the turns of the reel are liable to slip to form steps, thereby damaging the tape.

When the goods are transported in the upright position, i.e. with the reels and hubs placed vertically, the reels are liable to slip out of position when reels of different sizes are transported together.

When the goods reach the customer, difficulties are liable to arise due to clumsy handling or opening of the packages, the use of a knife, or the like.

Part of the package is destroyed on opening and cannot be used again.

The problem therefore arose of finding a multiple packing which would not have the disadvantages mentioned above but would provide optimum protection for the pancakes and would be easy to handle and use and inexpensive to manufacture and would be so designed that all parts could be used again and there would be no waste.

The invention has solved this problem by providing a packing of the type mentioned above having the characterising features of claim 1.

A large part of the defects mentioned above can now be prevented by centrally fixing the hubs. Further defects are prevented by using a hub support. It is only by providing these aids that transport in the upright position (with the hubs suspended from the central axis) now becomes possible. Further details of the invention will be apparent from the sub-claims, the figures and the description.

Figure 1:
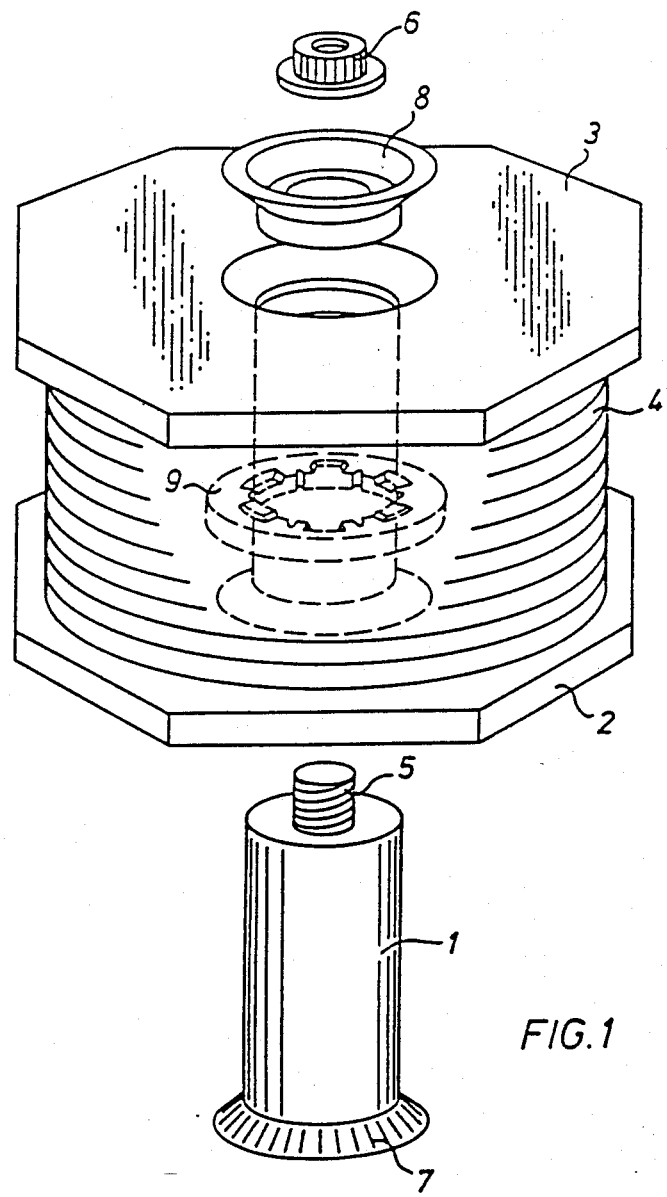
FIG. 1 shows an exploded view of a packing according to the invention.

The invention will now be described with reference to FIG. 1 which represents a preferred embodiment. The exploded view shows several recording carriers (4) in the form of tapes (so called pancakes) wound on any type of flangeless reel hub. The Figure shows a reel hub (9) according to U.S. Pat. No. 4,081,151.

These reel hubs enable a stack of pancakes to be transported within a very small space and with considerable saving of packaging material. The pancakes are protected at both end faces by stacking pallets (2, 3) in the form of discs, preferably of polystyrene, which may be circular or polygonal in outline, for example as disclosed in GB Pat. No. 1,576,973.

The centering sleeve (1) according to the invention is inserted through the central bore of the reel hubs (9) and of the polystyrene discs (2, 3). The diameter of the cylindrical part of the sleeve is equal to the diameter of the central bores. The base (7) of the centering sleeve is preferably in the form of a conical frustum and has ribs which prevent the centering sleeve from rotating against the equally frustum shaped bore of the disc (2). The top end of the supporting core has a thread (5) on which a screw cap (6) is placed. A washer (8) may be placed between the screw cap and the disc (3) to prevent rotation of the centering sleeve against the disc. The dimensions of the elements (1, 5, 6, 8) are such that the locking elements and the base of the supporting core are preferably flush with the surfaces of the discs (2, 3) so that the multiple package according to the innovation can be stacked. Variations of the centering sleeve are, of course, possible without thereby departing from the spirit of the invention:

The centering sleeve may have a central bore extending from its underside (to save material).

The locking device (6) may project above the surface (3) if the centering sleeve has a corresponding recess on its underside so that stacking is still possible.

The elements (5, 6) may interlock as a bayonet fitting instead of a screw fitting.

The centering sleeve may be symmetrical at its two ends, i.e. both ends may have a screw thread or bayonet thread designed to engage with corresponding closure elements.

Figure 2:
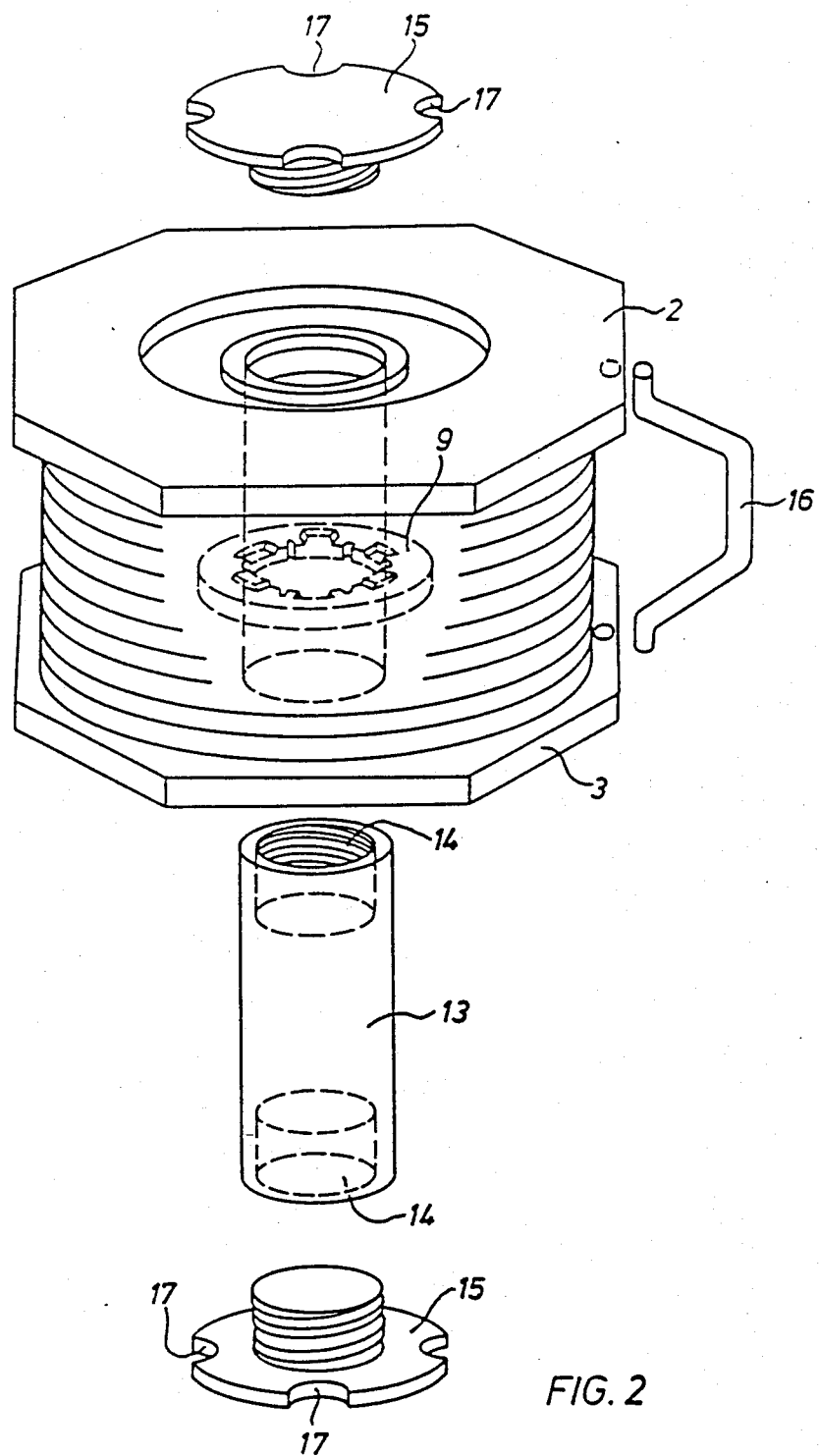
FIG. 2 shows an exploded view of another embodiment according to the invention.

Another embodiment, which is also preferred, is illustrated in FIG. 2.

The centering sleeve (13) is inserted through the central bore of the reel hub (9) and of the plastic discs (2, 3). A thread (14) is cut into bores at the upper and lower end of the centering sleeve for the attachment of screw nuts (15) which have recessed grips (17). A washer (not shown) may be provided between the screw cap and the pallet (3) to prevent rotation of the centering sleeve against the pallet. The dimensions of the elements (13, 14, 15) are such that the locking elements and the base of the centering sleeve are preferably flush with the surfaces of the pallets (2, 3) to ensure that the multiple packing according to the innovation can be stacked. A handle (16) for carrying the packaging unit may be inserted in recesses provided for this purpose in the plastic pellets (2, 3).

Figure 3:
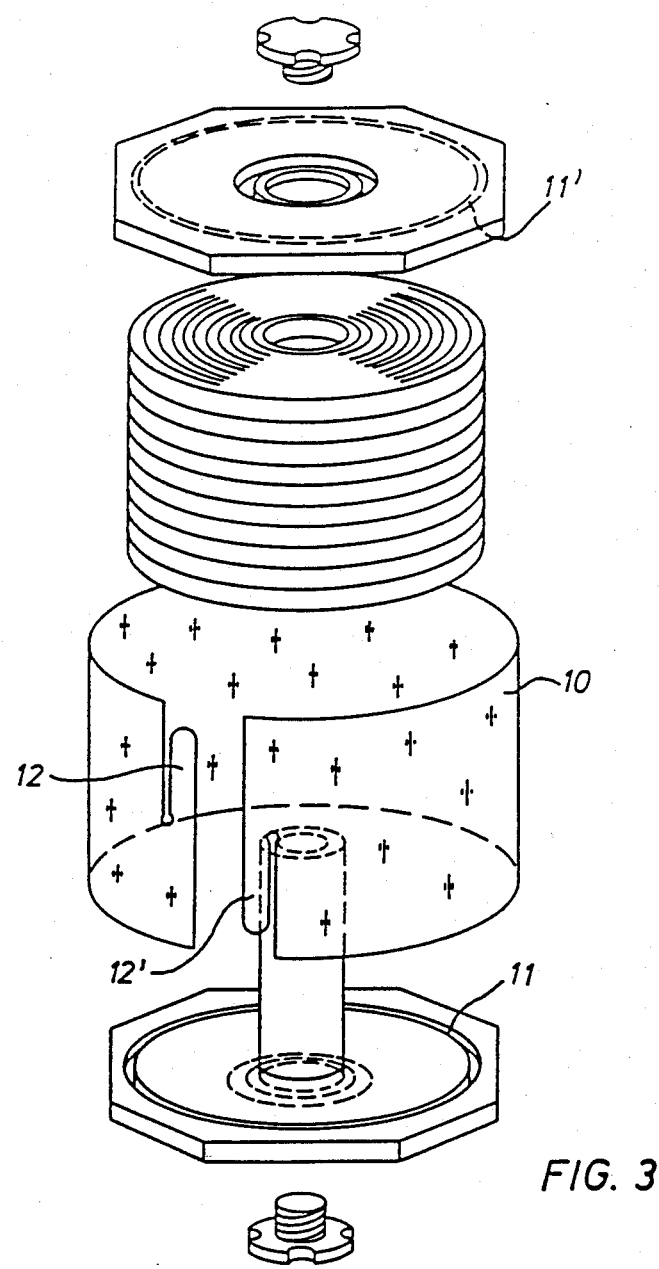
FIG. 3 shows an external protective jacket for a packing according to FIG. 2.

FIG. 3 is also an exploded view and shows an external protective jacket for the pancakes. This jacket consists of a rectangular sheet (10) the narrow sides of which can be fitted together by hooking elements (12, 12'). The circumferential edges of the sheet may be fitted into annular grooves (11, 11') on the inner sides of the pallets (2, 3) when the packaging unit is assembled.

Figure 4:
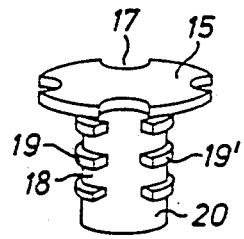
FIG. 4 shows an exploded view of another embodiment according to the invention.
Figure 4:
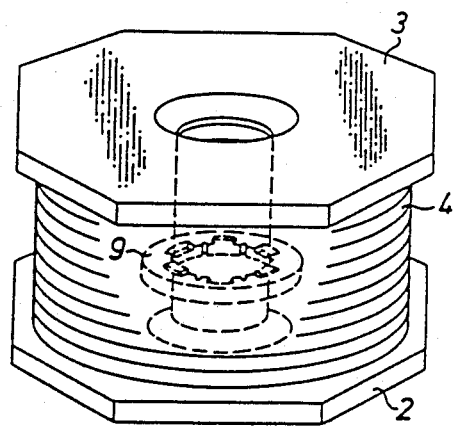
Figure 4:
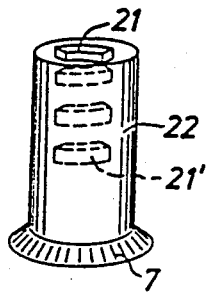

Another embodiment of the invention is shown in FIG. 4.

Two centering sleeves (20, 22) which can be locked together as will be described later are inserted in the central bores of the reel hubs (9) and of the plastic pallets (2, 3). The external diameter of the cylindrical part of the sleeve (20) is equal to the internal diameter of the hollow sleeve (22). The two sleeves can be locked together by inserting the cylindrical sleeve (20) into the hollow cylindrical sleeve (22) when the package is assembled. To enable the two sleeves to lock together, the sleeve (22) has preferably two diametrically opposite rows of elevations (21, 21') in the form of screw thread elements on its internal cylindrical surface extending slightly obliquely and forming circular arcs subtending an angle of not more than 90° while the cylindrical sleeve (20) has complementary elevations (19, 19') on its external surface (18) to interlock with the elevations (21, 21'). When the two parts are to be locked together, the sleeve (20) should be inserted in such a manner that the surfaces of its thread elements slide along those surfaces of the sleeve (22) which are free from elevations, and the threaded elements of the sleeve (20) can then be interlocked with the elevations on the sleeve (22) by rotating the sleeve (20) through 90° in one direction. Due to the oblique set of the elevations (21, 21', 19, 19'), the locking action also pushes the reel hubs together, thereby fixing them in position.

Figure 5:
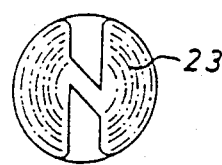
FIG. 5 is a view from above showing the top end of a grip according to one embodiment for a packing according to FIG. 4.

The gripping ends of the two sleeves (20, 22) are advantageously provided with recessed grips (17) to facilitate handling, as shown in FIG. 4, or slightly different recessed grips (23) as shown in FIG. 5.

The centering sleeves may be produced by extrusion blowing, injection moulding or casting and may consist of ABS, PP or some other rigid synthetic resin. For easy handling of the package according to the invention, various interlayers of foamed polystyrene or other synthetic resin foam or ordinary plastic sheeting may be placed between the pancakes. If thin sheets are used, they are preferably provided with loops for carrying.

The packing according to the invention provides inter alia the following advantages:

The whole package may be transported either upright or horizontally without any risk of the windings of the tape slipping or the reel forming into a dish since the pancakes are supported on the centring sleeve.

The packing is suitable for all types of cores and widths of tape.

The package need not be shrunk into a covering of film and can therefore be unpacked by the customer without any tools.

The packing may be opened and closed as often as desired and can therefore be used both for internal and external transport by the end user.

This type of packing is inevitably free from waste.

If the packing is polygonal, it will be steady when placed upright and therefore poses no problems in large containers.

The various parts may be made in different colours to simplify handling.

The supporting cores and reel hubs may easily be returned to the manufacturer of the pancakes after use to be used by him again.

We claim:

1. Packing for a plurality of recording carriers in the form of tapes wound on flangeless reel hubs which have central bores (so called pancakes), the packing comprising plastic pellets in the form of discs which protect the outer reels of tape each, disc being defined by an outer wall and an inner wall, and a fixing device rising up through the axial bore and having a diameter equal to the internal diameter of the bores in the reel hubs and in the plastic discs, characterised in that the fixing device is a centering sleeve (1, 13, 22) which can be inserted through the outer walls (2, 3) and through the central bores of the reel hubs (9) and has a closure element which co-operates with another closure element for locking and tightening, the centering sleeve optionally having further elements (7, 8) which prevent rotation of the centering sleeve against the outer walls of the plastic discs on opening or closing of the packing.

2. Packing according to claim 1, characterised in that the centering sleeve (1) has a closure element (5) on at least one of the two end faces, which closure element (5) co-operates with another closure element (6) so that the two can be locked or snapped together.

3. Packing according to claim 1, characterised in that the centering sleeve forms a conical frustum at one end face and has grooves (7) on the conical surface.

4. Packing according to claims 1 or 2, characterised in that a washer (8) is arranged between the locking element (6) and the wall (3).

5. Packing according to claim 1, characterised in that the centering sleeve (13) has threaded internal bores (14) at both end faces, into which screw caps (15) preferably provided with recessed grips (17) can be screwed, and the external peripheral surface of the pancake may be covered by a sheet (10) which can be fitted together at its ends and can be inserted in grooves (11, 11') on the inner surface of the pallets (2, 3).

6. Packing according to claim 5, characterised in that a handle (16) for carrying is designed to be inserted in recesses in the pallets (2, 3).

7. Packing according to claim 1, characterised in that the fixing device consists of two centring sleeves (20, 22) which can vbe inserted from both ends of the packing through the outer walls (2, 3) and through the central bores of the reel hubs (9) and can be locked together and tightened by one sleeve (22) being placed over the other sleeve (20).

8. Packing according to claim 7, characterised in that the centering sleeve (20) is a solid cylinder whose cylindrical external surface (18) carries preferably two diametrically opposite rows of elevations (19, 19') in the form of screw elements which extend slightly obliquely and each of which is in the form of a circular arc subtending an angle of not more than 90°, and in that the centering sleeve (22) is a hollow cylinder which can be inserted by its open end through the packing and the cylindrical internal surface of which has elevations (21, 21') similar and complementary to the elevations (19, 19').

9. Packing according to claims 7 or 8, characterised in that both centring sleeves have recessed grips (17, 23) at their gripping ends (15, 7).

10. Packing according to claim 1, characterised in that the pallets (2, 3) are made of acrylonitrile-butadiene-styrene copolymer (ABS) or foamed polystyrene, in that interlayers of foamed polystyrene or plastic sheeting are optionally placed between the pancakes (4) and in that the centering sleeve consists of a rigid plastic such as, for example, ABS.

* * * * *